United States Patent [19]
Erd et al.

[11] Patent Number: 4,951,023
[45] Date of Patent: Aug. 21, 1990

[54] ELECTROMAGNETIC DRIVE APPARATUS HAVING A FLAT COIL

[75] Inventors: Ludwig Erd; Klaus Menzel, both of Berlin, Fed. Rep. of Germany

[73] Assignee: Vacuumschmelze GmbH, Fed. Rep. of Germany

[21] Appl. No.: 755,275

[22] Filed: Jul. 15, 1985

[30] Foreign Application Priority Data

Jul. 14, 1984 [DE] Fed. Rep. of Germany ....... 3426042

[51] Int. Cl.$^5$ .............................. H01F 7/08; B41J 2/27
[52] U.S. Cl. .................................. 335/222; 101/93.05; 400/121; 400/124
[58] Field of Search ...................... 400/121, 124, 157.2, 400/157.3; 101/93.04, 93.05; 335/222

[56] References Cited

U.S. PATENT DOCUMENTS

| | | | |
|---|---|---|---|
| 3,136,934 | 6/1964 | Henry-Badot | 318/130 |
| 3,161,793 | 12/1964 | Laithwaite | 335/222 X |
| 3,935,399 | 1/1976 | Lian | 179/115.5 VC |
| 4,022,311 | 5/1977 | Krull | 101/93.34 X |
| 4,129,390 | 12/1978 | Bigelow | 400/121 |
| 4,211,493 | 7/1980 | Costello | 400/121 |
| 4,260,269 | 4/1981 | Peroutky | 400/121 |
| 4,349,283 | 9/1982 | Sapitowicz | 400/124 |

FOREIGN PATENT DOCUMENTS

| | | | |
|---|---|---|---|
| 2654075 | 6/1978 | Fed. Rep. of Germany | 400/322 |
| 1254923 | 1/1961 | France | 335/222 |
| 899678 | 6/1962 | United Kingdom | 335/222 |
| 989169 | 4/1965 | United Kingdom | 335/222 |

Primary Examiner—Edgar S. Burr
Assistant Examiner—Joseph R. Keating
Attorney, Agent, or Firm—Hill, Van Santen, Steadman & Simpson

[57] ABSTRACT

An electromagnetic drive apparatus for undertaking linear or circular movements as a flat coil disposed within a magnetic circuit, which may be formed by a iron core having one or more permanent magnets. The magnetic circuit includes at least one plate or coating of electrically conductive material which is spaced from the coil and coextensive with the area of movement of the coil within the magnetic circuit. The electrically conductive material promotes rapid change of the coil current due to induced eddy currents and thus contributes to a low response time, or alternatively to a high response speed, of the drive apparatus, particularly with the use of a pulsed drive signal.

17 Claims, 3 Drawing Sheets

ELECTROMAGNETIC DRIVE APPARATUS HAVING A FLAT COIL

BACKGROUND OF THE INVENTION

Field of the Invention

The present invention relates to electromagnetic drive devices, and in particular to electromagnetic drive devices employing a flat coil mounted for movement within a coil plane.

Description of the Prior Art

Electromagnetic drive devices, such as for actuating printer needles and the like, are known having a flat coil disposed within an iron core, the iron core being magnetically coupled to at least one permanent magnet for generating a magnetic field in the coil plane which is substantially perpendicular with respect to the coil plane. Such drive devices are particularly suited for limited, alternating linear movements or alternating movements about a segment of a circle, such as is required for driving printings devices.

SUMMARY OF THE INVENTION

It is an object of the present invention to provide an electromagnetic drive apparatus which has a low response time, or alternatively a high response speed, such that the coil responds by moving in the desired direction in as short a time as possible after a drive voltage is applied.

It is a further object of the present invention to provide such an electromagnetic drive apparatus which provides a fast current rise when utilized with a pulsed drive signal.

Because the determining factor for initiating movement of the coil within the coil plane is the current within the coil situated in the magnetic field, the force acting on the flat coil is dependent upon a rapid response of the coil to voltage pulses. This applies for the current rise as well as the current decrease in the coil. In order to promote rapid current increase and decrease within the flat coil of the aforementioned drive apparatus, in accordance with the principles of the present invention a plate or coating of electrically conductive material is disposed in the magnetic circuit for the apparatus parallel to and spaced from the coil plane. The dimensions of the plate or coating are selected so as to be coextensive with the area of movement of the flat coil within the coil plane. The coating or plate will thus cover the coil at every possible location thereof within the coil plane.

DESCRIPTION OF THE PREFERRED EMBODIMENTS

Figure 1A:
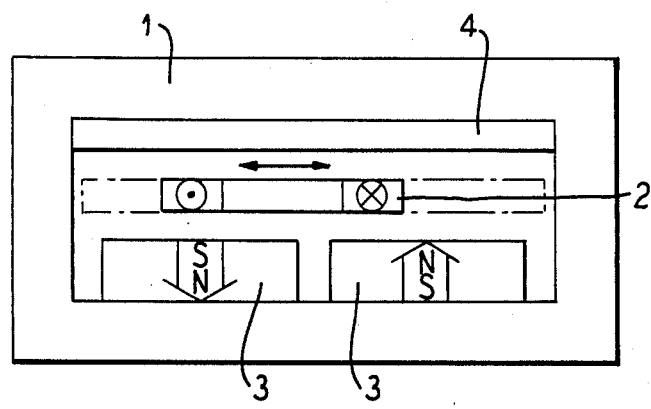
FIG. 1A is a side elevational view of an electromagnetic drive apparatus constructed in accordance with the principles of the present invention in a first embodiment.
Figure 1B:
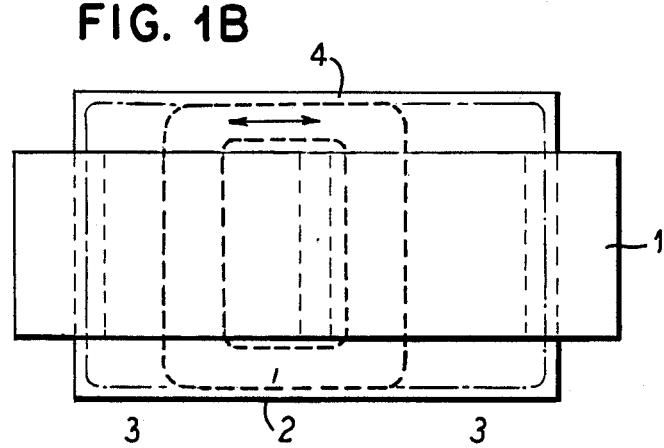
FIG. 1B is a plan view of the electromagnetic drive apparatus shown in FIG. 1A.

A first embodiment of an electromagnetic drive apparatus for effecting linear movement of the coil is shown in FIGS. 1A and 1B. The apparatus has a magnetic circuit including an iron core 1 and two permanent magnets 3. The minimum requirement is, however, that at least one permanent magnet be provided. The iron core 1 serves as a return path for the magnetic field generated by the permanent magnets 3. The permanent magnets 3 are disposed in proximity to a flat coil 2. The flat coil 2 has dimensions in the direction of the coil axis which are relatively small in comparison to the distance between the sections of a winding of the coil which lie opposite each other. The windings are wound to form a rectangle, as shown in FIG. 1B, so that the current within the flat coil generates a force acting substantially in one direction over a large portion of the current path. The flat coil 2 is mounted for longitudinal linear movement within the core 1 by any suitable means well known to those skilled in the art and therefore not shown in the drawings. The coil 2 moves in the direction of the double arrow shown in FIGS. 1A and 1B. The magnetic field is substantially perpendicular in the plane of the drawing to the arrow as shown in FIG. 1A. The coil 2 will thus be displaced to the right and left of the drawings. The magnetic forces acting on the coil conductor causes movement in these directions when the coil is supplied with a current. The coil 2 is shown in an intermediate position in solid lines, and at the extreme left and right positions indicated by dashed lines.

The iron core 1 has a plate or coating 4 consisting of electrically conductive material disposed thereon at a side thereof opposite the permanent magnets 3. The plate or coating 4 may consist, for example, of copper.

Figure 2:
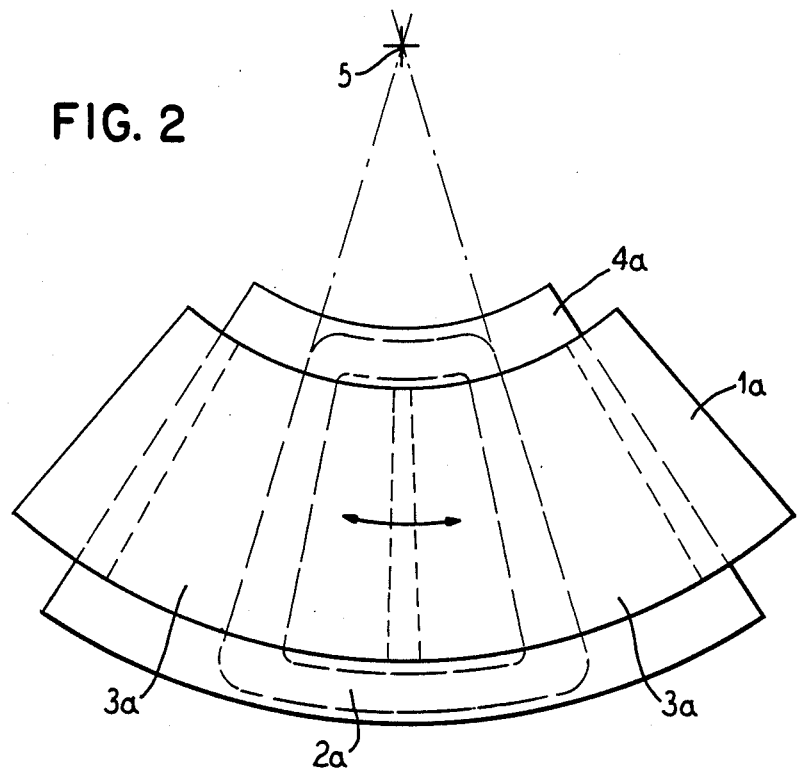
FIG. 2 is a plan view of a further embodiment of an electromagnetic drive apparatus constructed in accordance with the principles of the present invention for effecting limited circular movement.
Figure 3:
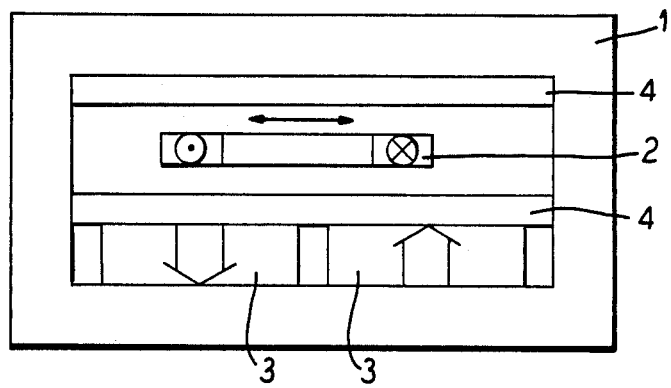
FIG. 3 is a side elevational view of another embodiment for linear movement of an electromagnetic drive apparatus constructed in accordance with the principles of the present invention.

As shown in FIG. 1B, the plate or coating 4 has an area which is coextensive with the entire area or range of possible movement of the coil 2 within the coil plane, and is spaced from and parallel to the coil plane containing the coil 2. The least complicated shape for the plate or coating 4 is substantially a rectangle. An eddy current forms within the plate or coating 4 given a change of current direction in the flat coil 2. This eddy current proceeds substantially parallel to the coil conductors of the coil 2, thus promoting fast rise or fast decrease, as the case may be, of the current within the flat coil 2 without excessively large magnetic field changes occurring in the magnetic circuit formed by the iron core 1 and the permanent magnets 3. By virtue of contact with the core 1, the plate or coating 4 is magnetically coupled within the magnetic circuit. A further embodiment of an electromagnetic drive apparatus constructed in accordance with the principles of the present invention for limited circular movement is shown in plan view in FIG. 2. This embodiment has a core 1A which is a segment of a ring, and also employs similar shaped permanent magnets 3a, also formed as segments of a ring concentric with the ring segment defined by the core 1a. The flat coil 2a in this embodiment is in the form of a trapezoid having two substantially straight sides joining two opposite sides which are slightly curved, again essentially forming a segment of a ring, as indicated by the convergence of the sides at an imaginary point 5. The apparatus of FIG. 2 further includes a plate or coating 4a, which is also formed as a segment of a ring and, as in the previously-discussed embodiment, is coextensive with the entire range of movement of the flat coil 2a. The curved plate or coating 4a is again parallel to and spaced from the plane containing the coil 2a. Limited movement along an arc of a circle, as indicated by the curved double arrow, is achieved by the coil 2a in the embodiment of FIG. 2. As in the embodiment of FIG. 1, a single permanent magnet may be utilized instead of two permanent magnets. A further embodiment of the rectangular version of the drive apparatus constructed in accordance with the principles of the present invention is shown in FIG. 3, employing two parallel plates or coatings 4. One plate is disposed adjacent the permanent magnets 3 on one side of the flat coil 2, and the other plate or coating 4 is disposed spaced from the coil 2 on the opposite side thereof. The use of two such plates or coatings 4 even further promotes rapid rise and decay times of the current in the coil 2. This embodiment can also be utilized in the circular arrangement of FIG. 2.

Figure 4:
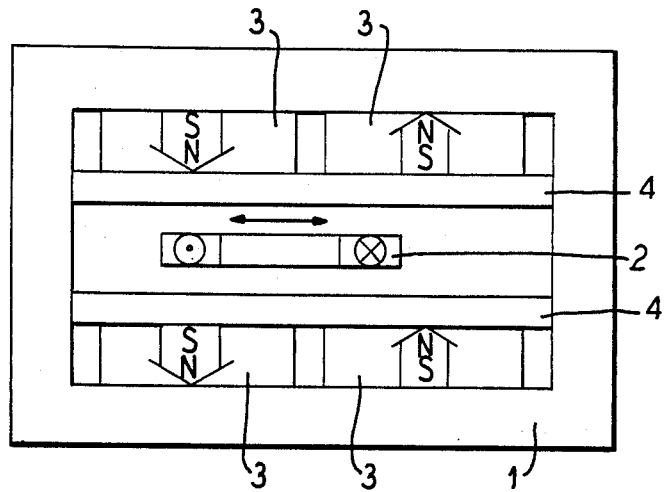
FIG. 4 is a side elevational view of a further embodiment of an electromagnetic drive apparatus for linear movement constructed in accordance with the principles of the present invention.
Figure 5:
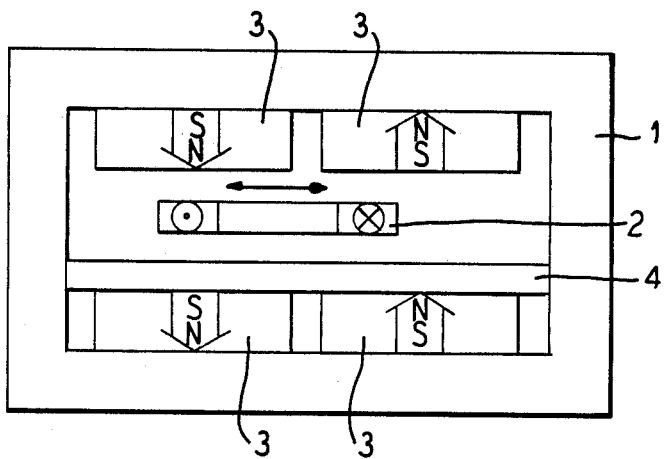
FIG. 5 is a side elevational view of yet another embodiment of an electromagnetic drive apparatus for linear movement constructed in accordance with the principles of the present invention.

Another embodiment of the drive apparatus is shown in FIG. 4 employing two pairs of permanent magnets 3, each pair of magnets 3 being covered by a plate or coating 4 disposed on opposite sides of the flat coil 2. A modification of this arrangement is shown in FIG. 5, again employing two pairs of permanent magnets 3, but only one plate or coating 4.

Although other modifications and changes may be suggested by those skilled in the art it is the intention of the inventors to embody within the patent warranted hereon all changes and modificatons as reasonably and properly come within the scope of their contribution to the art.

We claim as our invention:

1. An electromagnetic drive apparatus comprising:
   a flat coil having a coil conductor defining a coil plane, said coil being mounted for movement within an area of said plane;
   means for generating a magnetic field in said coil plane substantially perpendicular to said coil plane;
   an electrically conductive element disposed parallel to said coil plane and spaced from said coil, said electrically conductive element having dimensions coextensive with said area of said plane and mounted so as to remain stationary during movement of said coil; and
   means for magnetically coupling said electrically conductive element and said means for generating and magnetic field.

2. An electromagnetic device comprising:
   a movable coil displaceable in an area of a coil plane;
   means for magnetically displacing said coil in said coil plane; and
   stationary means for promoting rapid increase or decrease of current in said coil magnetically coupled to said means for magnetically displacing said coil and disposed parallel to and spaced from said coil, and being coextensive with said area.

3. An electromagnetic device comprising:
   means for generating a current path in a current plane;
   means operating on said current path for displacing said current path within a limited area of said current plane; and
   stationary means magnetically operable on said current path for promoting rapid change in current direction in said current path being parallel to and spaced from said current path and coextensive with said area of said current plane.

4. An electromagnetic drive apparatus comprising:
   means forming a magnetic circuit for generating a magnetic field;
   a flat foil disposed for movement through an area in a direction substantially perpendicular to said magnetic field; and
   an electrically conductive element in said magnetic circuit disposed parallel to and spaced from said coil and coextensive with said area, and mounted so as to remain stationary during movement of said coil.

5. An electromagnetic drive apparatus as claimed in claim 4 wherein said electrically conductive element is a metal plate.

6. An electromagnetic drive apparatus as claimed in claim 4 wherein said electrically conductive element is comprised of copper.

7. An electromagnetic drive apparatus as claimed in claim 4 wherein said magnetic circuit includes an iron core.

8. An electromagnetic drive apparatus as claimed in claim 7 wherein said electrically conductive element is a coating of electrically conductive material covering a portion of said iron core.

9. An electromagnetic drive apparatus as claimed in claim 4 wherein said magnetic circuit includes at least one permanent magnet.

10. An electromagnetic drive apparatus as claimed in claim 9 wherein said electrically conductive element is a coating of electrically conductive material covering said permanent magnet.

11. An electromagnetic drive apparatus as claimed in claim 9 wherein said electrically conductive element is a metal plate covering said permanent magnet.

12. An electromagnetic drive apparatus as claimed in claim 4 wherein said coil is mounted for linear movement and wherein said electrically conductive element has a substantially rectangular section parallel to said coil.

13. An electromagnetic drive apparatus as claimed in claim 4 wherein said coil is mounted for movement along an arc of a circle, and wherein said electrically conductive element has a section parallel to said coil which is a segment of a ring concentric with said circle.

14. An electromagnetic drive apparatus as claimed in claim 4 wherein said magnetic circuit includes a magnet coupler having an opening with parallel sides and wherein said coil is mounted in said opening between and parallel to said parallel sides thereof, of wherein said electrically conductive element is disposed adjacent one of said parallel sides of said opening.

15. An apparatus as claimed in claim 14 wherein said magnetic circuit includes at least one permanent magnet, and wherein said permanent magnet is disposed adjacent one of said parallel sides of said opening.

16. An electromagnetic drive apparatus as claimed in claim 15 wherein said permanent magnet is disposed adjacent an opposite side of said opening with respect to said electrically conductive element.

17. An electromagnetic drive apparatus as claimed in claim 4 wherein said magnetic circuit includes two pairs of permanent magnets disposed on opposite sides of said coil and spaced therefrom.

* * * * *